(12) United States Patent
Wågström et al.

(10) Patent No.: US 11,891,053 B2
(45) Date of Patent: Feb. 6, 2024

(54) VEHICLE TOTAL SAFETY PERFORMANCE APPLICATION AND METHOD UTILIZING CRASH CONFIGURATION INFORMATION

(71) Applicant: Volvo Car Corporation, Gothenburg (SE)

(72) Inventors: Linus Wågström, Nödinge (SE); Alexandros Leledakis, Gothenburg (SE); Jonas Östh, Gothenburg (SE); Magdalena Lindman, Alafors (SE); Lotta Jakobsson, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 725 days.

(21) Appl. No.: 16/886,843

(22) Filed: May 29, 2020

(65) Prior Publication Data

US 2020/0377081 A1    Dec. 3, 2020

Related U.S. Application Data

(60) Provisional application No. 62/856,186, filed on Jun. 3, 2019.

(51) Int. Cl.
 *B60W 30/09* (2012.01)
 *B60R 21/013* (2006.01)

(52) U.S. Cl.
 CPC ........... *B60W 30/09* (2013.01); *B60R 21/013* (2013.01); *B60R 2021/01315* (2013.01);
 (Continued)

(58) Field of Classification Search
 None
 See application file for complete search history.

(56) References Cited

U.S. PATENT DOCUMENTS

| | | | |
|---|---|---|---|
| 2002/0103549 A1* | 8/2002 | Cooper | G05B 15/02 700/33 |
| 2003/0036892 A1 | 2/2003 | Burge et al. | |

(Continued)

FOREIGN PATENT DOCUMENTS

| | | |
|---|---|---|
| CN | 102034257 A | 4/2011 |
| CN | 103158657 A | 6/2013 |

(Continued)

OTHER PUBLICATIONS

Oct. 21, 2020 European Search Report Issued on International U.S. Appl. No. 20/177,784.

(Continued)

*Primary Examiner* — Christian Chace
*Assistant Examiner* — Katherine Marie Fitzharris
(74) *Attorney, Agent, or Firm* — Clements Bernard Walker; Christopher L. Bernard

(57) ABSTRACT

A methodology, including: receiving first input related to expected states of a vehicle and another vehicle or object at impact event initiation with positions, orientations, and velocities as parameters used for impact event evaluation; receiving second input related to expected vehicle occupant position and position transfer during a pre-impact event maneuver; and simulating an impact event involving the vehicle and the another vehicle or object using both the first input and the second input to quantify the performance of a safety system of the vehicle with a combined effect from a collision avoidance feature and an injury prevention feature. The method further includes filtering out a case where a vehicle occupant pre-crash position excursion is expected to exceed a predetermined threshold.

20 Claims, 16 Drawing Sheets

(52) U.S. Cl.
CPC ..... *B60W 2520/10* (2013.01); *B60W 2520/12* (2013.01); *B60W 2556/10* (2020.02)

(56) References Cited

U.S. PATENT DOCUMENTS

| | | | |
|---|---|---|---|
| 2004/0129478 | A1 | 7/2004 | Breed et al. |
| 2006/0052924 | A1* | 3/2006 | Prakah-Asante ... B60R 21/0134 |
| | | | 701/45 |
| 2007/0143087 | A1* | 6/2007 | Musale ............ G01M 17/0078 |
| | | | 703/8 |

FOREIGN PATENT DOCUMENTS

| | | | | |
|---|---|---|---|---|
| EP | 1902908 | A2 | 3/2008 | |
| EP | 2133244 | A2 | 12/2009 | |
| EP | 2233370 | A1 * | 9/2010 | ........... B60R 21/013 |
| EP | 2233370 | A1 | 9/2010 | |
| WO | 2009137582 | A1 | 11/2009 | |

OTHER PUBLICATIONS

May 10, 2023 Office Action issued in corresponding CN Application No. 202010494937.4.

\* cited by examiner

VEHICLE TOTAL SAFETY PERFORMANCE APPLICATION AND METHOD UTILIZING CRASH CONFIGURATION INFORMATION

CROSS-REFERENCE TO RELATED APPLICATION

The present disclosure claims the benefit of priority of U.S. Provisional Patent Application No. 62/856,186, filed on Jun. 3, 2019, and entitled "VEHICLE TOTAL SAFETY PERFORMANCE APPLICATION AND METHOD UTILIZING CRASH CONFIGURATION INFORMATION," the contents of which are incorporated in full by reference herein.

TECHNICAL FIELD

The present disclosure relates generally to the automotive field. More specifically, the present disclosure relates to a vehicle total safety performance application and method utilizing crash configuration information.

BACKGROUND

Road traffic safety continues to play a major role in the overall health of the world's population. Today, road traffic accidents are the eighth leading cause of death for people of all ages, annually amounting to approximately 1.35 million fatalities worldwide. Continuing to strive for improved road traffic safety is therefore in the interest of all stakeholders in road traffic systems. Visions of reducing the number of road fatalities towards zero have been put forward by numerous countries, states, counties, and cities. However, recent data suggests that the number of fatalities and injuries on European as well as on U.S. roads has started to level out or even increase.

From a vehicle design point of view, a long tradition of improvements has been seen related to crash safety, i.e. injury prevention in the case of a crash occurring. More recently, automated collision avoidance technologies have emerged, raising expectations for a future with autonomous vehicles in which crashes can be avoided. By studying real-world crash data, it can be seen that both systems for injury prevention as well as systems for collision avoidance do have considerable effects on the number of injuries. Developing assessment tools that predictively can quantify how many crashes can be avoided, but also predict the effect on injuries from those remaining, non-avoided, crashes is therefore important for injury prevention in future passenger vehicles.

Today, assessment of the real-world safety performance of a vehicle model is done by analysis of retrospective data, available years after introduction. In addition to this, the effect of safety systems is predicted before these safety systems have been put into production. This is done with established methods involving physical crash testing and simulation using computer aided engineering (CAE). For integrated safety, i.e. how safety systems aimed at collision avoidance and injury prevention interact with and complement each other, methods need to be refined in order to make such predictions. The use of virtual tools for integrated safety is therefore a key component in order to predict expected crash outcomes, providing decision-making data for developing the most effective safety systems.

In this process, understanding future crash scenarios and transferring this knowledge into specific crash configurations becomes an important factor. Methods of calculating the effect of collision avoidance systems in terms of injury outcomes and accidents avoided or mitigated have been developed. Such a method based on available traffic accident data has been developed with the aim to support the system development process by offering an opportunity to alternate input parameters, such as, braking (acceleration) level in order to determine the effect of these changes. The method has further refined including the actual system algorithm in a relevant vehicle and sensing model. These methods include estimations of the consequences of a crash using risk functions based on real-world traffic accident data, by assuming a modified injury risk as a result of reduced crash severity. However, these methods, as well as established ways for describing crashes, such as using the collision deformation classification (CDC) or principal direction of force (PDOF), have been found to lack the level of detail needed to describe subtle relative changes in crash configuration to support CAE studies in the form of structural and occupant finite element (FE) simulations. With a refined description of crash configurations, the effects of collision avoidance interventions can be described and evaluated by simulating a range of traffic situations that are likely to occur. By applying probable distributions of the input parameters, the robustness and sensitivity of the system can be evaluated.

Another context for which the interaction between systems for collision avoidance and injury prevention becomes increasingly important relates to occupant re-positioning due to pre-crash accelerations, regardless whether human drivers or autonomous intervention systems. These effects are possible to study in volunteer experiments and it has been found that the muscle activation of car occupants has a considerable influence on the kinematic pre-crash response, leading to a need for active human body models (A-HBMs) in order to study these effects using CAE tools. Several approaches to A-HBMs have been proposed and a potential for use in product development has been demonstrated. The most detailed injury prediction response based on tissue level can be provided by FE A-HBMs, which, however, are all computationally intensive. This is even more pronounced when pre-crash maneuvers are considered, these often have a duration of seconds whereas crash simulations typically span 100-200 milliseconds. It is therefore not seen as feasible to deploy FE A-HBMs directly in larger simulation studies with thousands of cases for estimating the effect of collision avoidance systems. In this context, a computationally efficient model indicating occupant pre-crash motion including effects of muscle tensioning is therefore desired. With such a tool, a smaller number of critical or dimensioning cases could be filtered out from a larger sample set for further analysis using FE A-HBMs. From volunteer studies of belted passenger car occupant kinematics during pre-crash maneuvers, it has been observed that the pelvis displacement is small compared to the movement of the head and torso, suggesting a model of only the upper body could be could be useful for studying pre-crash occupant kinematics.

Thus, the overall aim of the present disclosure is to create a CAE methodology for predicting the combined safety performance from collision avoidance systems (e.g. autonomous emergency braking (AEB)) as well as systems for injury prevention (e.g. seatbelts and airbags). Specific aims are to establish two important elements in this simulation methodology. The first element concerns real-world data, and the transfer of real-world pre-crash situations into crash configurations to be used in crash simulations providing insight into occupant protection. The second considers the human occupant, enabling computationally efficient prediction of position transfer between pre-crash situations and crashes. This background provides an exemplary context and environment only for the methodologies of the present disclosure, and it will be readily apparent to those of ordinary skill in the art that the methodologies of the present disclosure may be practiced in other contexts and environments as well.

SUMMARY

In one exemplary embodiment, the present disclosure provides a method, including: receiving first input related to expected states of a vehicle and another vehicle or object at impact event initiation with positions, orientations, and velocities as parameters used for impact event evaluation; receiving second input related to expected vehicle occupant position and position transfer during a pre-impact event maneuver; and simulating an impact event involving the vehicle and the another vehicle or object using both the first input and the second input to quantify the performance of a safety system of the vehicle with a combined effect from a collision avoidance feature and an injury prevention feature. The method further includes filtering out a case where a vehicle occupant pre-crash position excursion is expected to exceed a predetermined threshold. The first input includes real-world pre-impact event data related to paths, velocities, and surroundings in time history data format. The first input also includes output from a computer aided engineering simulation of a Baseline impact event without a collision avoidance system implemented and a Treatment impact event with the collision avoidance system implemented. The first input further includes parametric crash configuration data related to the vehicle and the another vehicle or object at the impact event initiation. The second input includes a simplified occupant kinetics model. Simulating the impact event includes simulating effects of a pre-crash phase and the impact event using vehicle occupant and interior models using an active human body model. Simulating the impact event also includes simulating the vehicle structural effects of the impact event using a structural simulation.

In another exemplary embodiment, the present disclosure provides a non-transitory computer readable medium including combined safety system performance simulation and evaluation instructions stored in a memory and executed by a processor to carry out the steps, including: receiving first input related to expected states of a vehicle and another vehicle or object at impact event initiation with positions, orientations, and velocities as parameters used for impact event evaluation; receiving second input related to expected vehicle occupant position and position transfer during a pre-impact event maneuver; and simulating an impact event involving the vehicle and the another vehicle or object using both the first input and the second input to quantify the performance of a safety system of the vehicle with a combined effect from a collision avoidance feature and an injury prevention feature. The steps further include filtering out a case where a vehicle occupant pre-crash position excursion is expected to exceed a predetermined threshold. The first input includes real-world pre-impact event data related to paths, velocities, and surroundings in time history data format. The first input also includes output from a computer aided engineering simulation of a Baseline impact event without a collision avoidance system implemented and a Treatment impact event with the collision avoidance system implemented. The first input further includes parametric crash configuration data related to the vehicle and the another vehicle or object at the impact event initiation. The second input includes a simplified occupant kinetics model. Simulating the impact event includes the step of simulating effects of a pre-crash phase and the impact event using vehicle occupant and interior models using an active human body model. Simulating the impact event also includes the step of simulating the vehicle structural effects of the impact event using a structural simulation.

In a further exemplary embodiment, the present disclosure provides a system, including: memory storing vehicle simulation instructions executed by a processor for receiving first input related to expected states of a vehicle and another vehicle or object at impact event initiation with positions, orientations, and velocities as parameters used for impact event evaluation; the memory storing vehicle occupant simulation instructions executed by the processor for receiving second input related to expected vehicle occupant position and position transfer during a pre-impact event maneuver; and the memory storing combined impact event simulation instructions executed by the processor for simulating an impact event involving the vehicle and the another vehicle or object using both the first input and the second input to quantify the performance of a safety system of the vehicle with a combined effect from a collision avoidance feature and an injury prevention feature. The system also includes the memory storing focus case selection instructions executed by the processor for filtering out a case where a vehicle occupant pre-crash position excursion is expected to exceed a predetermined threshold. The first input includes: real-world pre-impact event data related to paths, velocities, and surroundings in time history data format, output from a computer aided engineering simulation of a Baseline impact event without a collision avoidance system implemented and a Treatment impact event with the collision avoidance system implemented, and parametric crash configuration data related to the vehicle and the another vehicle or object at the impact event initiation, and the second input includes: a simplified occupant kinetics model. Simulating the impact event includes simulating effects of a pre-crash phase and the impact event using vehicle occupant and interior models using an active human body model and simulating the vehicle structural effects of the impact event using a structural simulation.

BRIEF DESCRIPTION OF THE DRAWINGS

The present disclosure is illustrated and described herein with reference to the various drawings, in which:

FIG. 16 is a block diagram of a server which may be used in the cloud-based system of FIG. 15 or the like; and FIG. 17 is a block diagram of a user device which may be used in the cloud-based system of FIG. 15 or the like.

DESCRIPTION OF EMBODIMENTS

Figure 1:
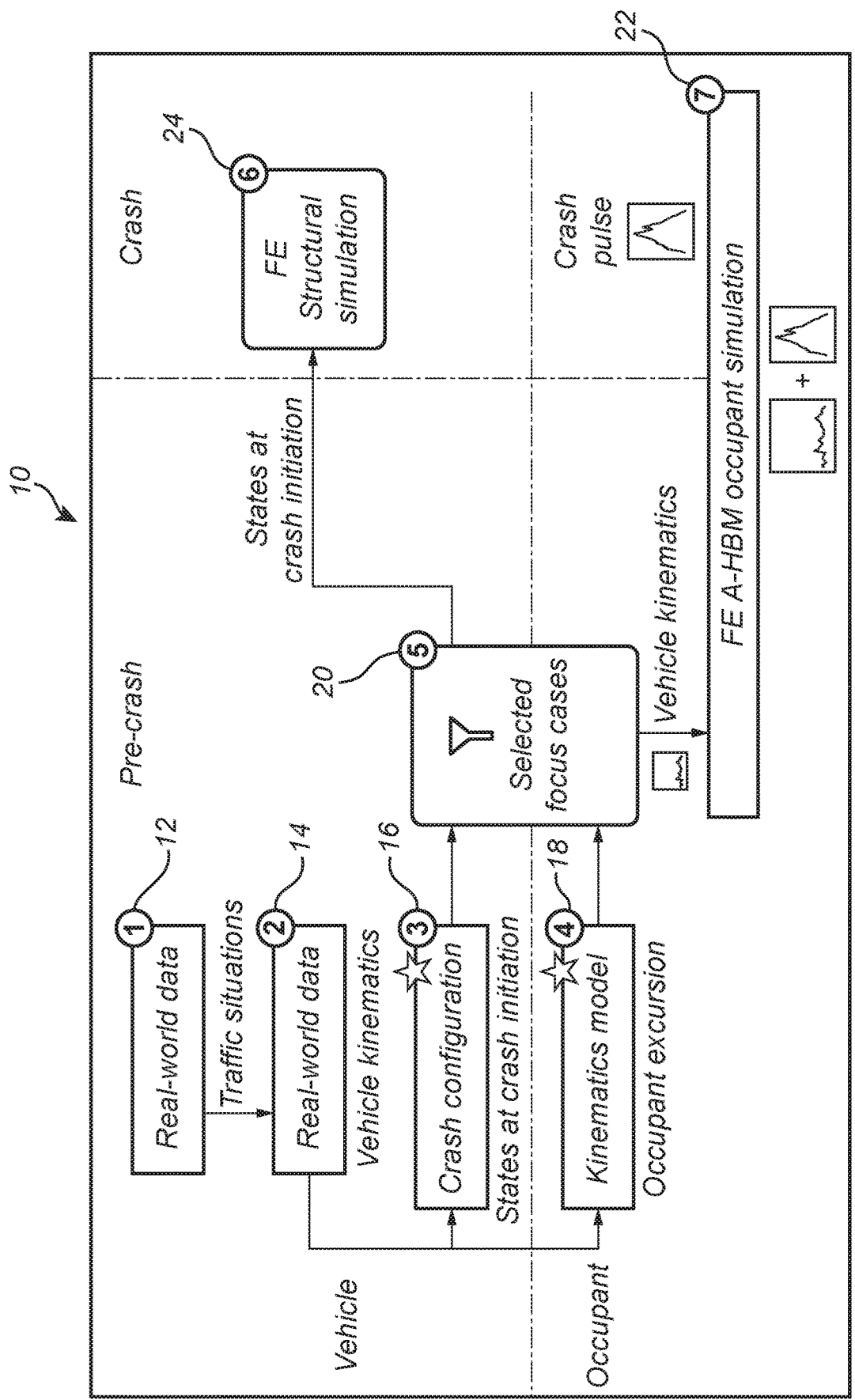
FIG. 1 is an overview of the total safety performance methodology of the present disclosure.

As technologies for injury prevention and crash avoidance both contribute to injury reduction in vehicle crashes, tools for predicting the combined effect of all safety features are needed. The present disclosure aims at establishing a computer simulation methodology including two important elements for assessing this combined effect. The first element describes the states of the involved vehicles or objects at crash initiation regarding positions, orientations, and velocities as parameters used for crash evaluation. The second element focuses on the vehicle occupant, enabling computationally efficient prediction of occupant position transfer during pre-crash maneuvers.

Real-world data from a traffic accident database (TAD) is used as the basis for pre-crash simulations involving two vehicles, with and without a conceptual autonomous emergency braking (AEB) function, for example. For cases in which the crash is not avoided by the AEB function, the crash configuration is identified. A SOCKIMO is developed and applied to these remaining crashes, supporting the selection of crash situations to be analyzed in detail. The SAFER HBM is used for simulation of the occupant response, providing information on pre-crash kinematics, as well as the occupant crash response.

As a result, a novel crash configuration definition for estimating the consequences of vehicle crashes based on preceding events is established. The PARCC definition can be used as a link between pre-crash and crash simulation tools, as well as for illustrating sets of real-world accident data and how these change based on maneuvers preceding a crash. SOCKIMO results demonstrate occupant kinematics similar to those of volunteers, and the subsequent simulations using the SAFER HBM show considerable changes in occupant crash response based on pre-crash vehicle kinematics.

The PARCC definition can also be applied to collision objects, such as trucks or vulnerable road users. The developed SOCKIMO can be used to filter out cases from large crash data sets to be further analyzed with detailed models, FE A-HBMs. By applying the more detailed HBMs, the effects of avoidance maneuvers on occupant kinematics relevant for injury prediction can be evaluated. This approach would not be possible using simplified occupant models only (due to the lack of details) or by using detailed models only (due to the large simulation effort).

The presented methodology for estimating combined safety performance can be used for transferring output from pre-crash simulations to input for crash simulations. The feasibility of combining the individual elements of this methodology is demonstrated in an example case where AEB leads to a large change in the crash configuration and is predicted to introduce substantial occupant pre-crash excursion. In this example case, it is shown that the present A-HBM tool is able to cover the complete sequence from pre-crash maneuvers to crash in one single simulation.

A methodology is presented for estimating the total safety performance based on CAE tools, i.e. how the effects of countermeasures aimed at injury prevention before and during a crash can be described using computer models in order to summarize these effects for larger sets of traffic scenarios. This is followed by one specific example case which is chosen to demonstrate and further explain the selection process and the transfer of data between CAE tools.

The overall methodology 10 contains seven elements, as illustrated in FIG. 1. It has its basis in real-world data, and provides output of vehicle occupant response during the complete sequence of events covering both pre-crash and crash phases. When applying the methodology, the process starts with identifying real-world traffic situation datasets relevant for the research question at hand, as illustrated by element 1 and ends with the output that is given from occupant pre-crash and crash simulation in element 7. Each of these and intermediate elements are further described below.

Element 1: Real-World Data 12. Representing a range of real-world traffic situations, a set of data 12 is used as the starting point for this methodology 10. Each case in this database 12 represents a collision relevant for the research question that will be studied. Information needed for the baseline pre-crash simulation are e.g. vehicle paths in relation to vehicle velocities and to the surroundings in a numerical time history data (THd) format.

Element 2: Collision Avoidance (CA)-CAE (14). In the next step, a "Baseline" pre-crash simulation is performed to reflect the original real-world data 12. This is then compared to another dataset called "Treatment" which includes the collision avoidance technology to be studied. This tool for CA-CAE 14 should include models where sensor and actuator parameters can be adjusted. The CA-CAE tools 14 may also include driver models to simulate how human drivers interact with the vehicle. In its simplest form, the driver model is a path follower that provides driver input in order to make the vehicle follow the time-dependent states given in the real-world data cases 12. The validity of the CA-CAE tools 14 should be ensured by comparing subsets of pre-crash simulation data to corresponding data collected from physical tests performed on test tracks or public roads.

Elements 3-4: Crash Configuration 16 and Occupant Pre-Crash Kinematics model 18. The output from the CA-CAE tools 14 in element 2 are time histories of variables describing the states of all vehicles or objects involved in a crash. If the CA-CAE tools 14 indicate that the collision is avoided, the process will stop after element 2. However, in cases where a crash still occurs, the influence of the pre-crash phase needs to described and possibly considered in the crash phase. For this purpose, element 3 in FIG. 1 regarding crash configuration 16 and element 4, an occupant pre-crash kinematics model 18, are defined. These elements describe how the pre-crash phase has influenced the crash configuration as well as how the occupant position may have been affected by the pre-crash phase. They are both marked with a star in FIG. 1, and proposals for such elements are presented in separate sections below.

Element 5: Selected Focus Cases 20. In the next phase, the methodology 10 allows the user to select certain cases that may be of special interest by filtering out cases where the crash configuration indicates a high crash severity, if particular impact locations are identified or if a pre-crash intervention changes the crash configuration 16 to a large extent. Since the number of cases can be extensive, the occupant pre-crash kinematics model 18 is used to further filter out cases where it can be expected that the occupant would experience considerable pre-crash excursion, i.e. displacement due to vehicle accelerations. By selecting this smaller sample of the collision avoidance simulation cases 16, the simulation effort using the FE A-HBM (element 7) 22, where the pre-crash vehicle kinematics is combined with the crash pulse from the FE structural crash simulation 24, can be substantially reduced.

Element 6: FE Structural Crash Simulation 24. The purpose of the crash configuration definition is to provide a description of the states of the ego/host vehicle at impact as well as the crash counterpart that can be fed into an FE structural crash simulation 24 of the two objects involved in the collision, or as input to setting up physical crash tests. This simulation could theoretically include also an FE A-HBM, however due to computational efficiency, the structural and occupant crash simulations are normally split into two separate simulations for each case. In this way, output from the FE structural crash simulation 24 can be fed into the complete-sequence (pre-crash and crash) occupant crash simulation using an FE A-HBM 22, element 7 in FIG. 1.

Element 7: FE A-HBM Occupant Simulation 22. In this element, the effects of the pre-crash phase and the subsequent crash are studied using an occupant and interior model. For the development of the current methodology 10, the SAFER HBM occupant model is used, for example. This is a 50th percentile male model based on the THUMS v3 model but substantially updated by the partners of the SAFER Vehicle and Traffic Safety Centre at Chalmers in Gothenburg, Sweden. The head and brain model is replaced with the KTH head model, for example. The rib cage is updated with a more detailed model with rib curvature and cortical bone thickness representative of the average 50th percentile male from relatively large sample studies, for example. The cervical and lumbar spine of the model is updated with non-linear ligament and intervertebral disc models, for example.

Figure 2:
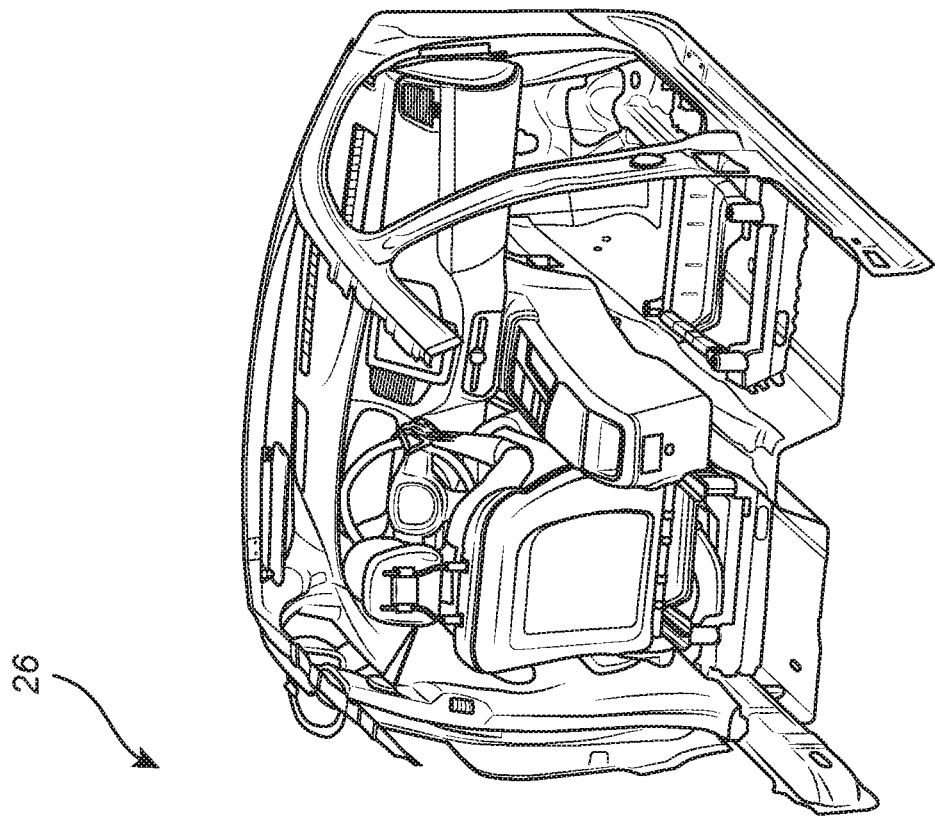
FIG. 2 is a human body model (HBM) in a crash simulation showing the movement of soft tissues and the musculoskeletal structure (left) and an overview of a FE vehicle interior model (right)
Figure 2:
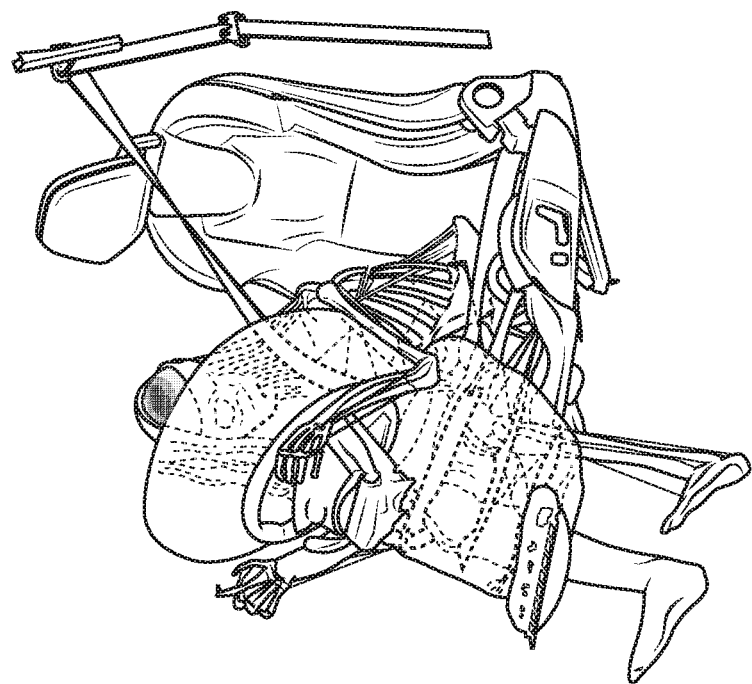

The SAFER HBM 26, FIG. 2, has active musculature implemented using Hill-type beam muscle elements controlled by feedback controllers. The most recent update of the active muscle control includes an omnidirectional lumbar and cervical spine controller, which enables modelling of both vehicle driver and passenger reflexive and postural responses in pre-crash scenarios.

Figure 3:
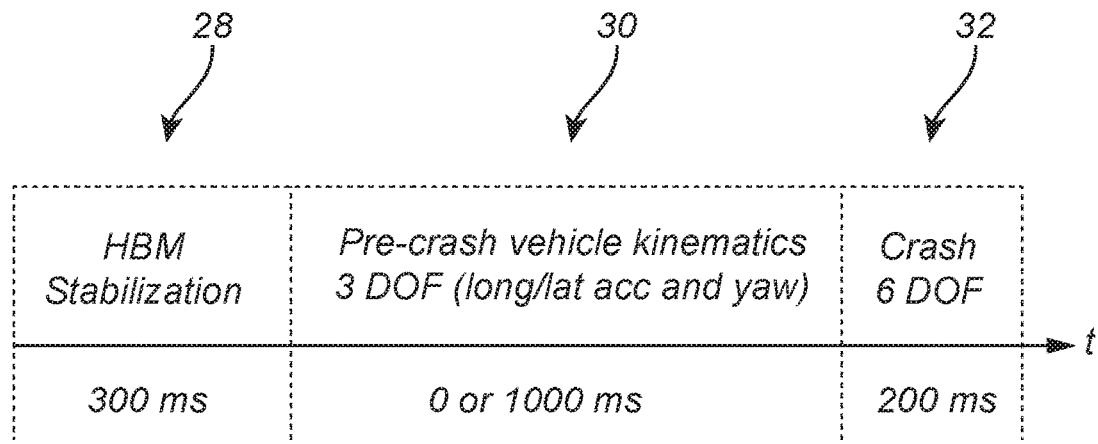
FIG. 3 is an overview of a simulation sequence for pre-crash and crash.

The vehicle interior used in this study consists of a rigid sled model representing a passenger vehicle body structure where deformable models of the interior components, such as seat, steering wheel, instrument panel, airbags, and seat belts, are included, FIG. 2. To simulate the complete sequence of events, three phases are included in the same occupant simulation model as illustrated in FIG. 3. The first phase 28 is for HBM 26 stabilization needed for the model to find equilibrium under gravity loading and with active muscles. During this phase 28, which lasts for 300 ms, the rigid sled is stationary. In the following phase 30 of pre-crash vehicle kinematics (PCVK), the maneuver from the CA-CAE pre-crash simulation 14 (FIG. 1) is given as prescribed motion to the sled. In this study, the PCVK 30 includes three degrees of freedom (DOF): longitudinal and lateral acceleration of the vehicle, as well as yaw velocity. The PCVK phase 30 has a duration of 1000 ms when included. In the last phase 32 of the sequence, a crash pulse lasting 200 ms recorded from the FE structural crash simulation 24 (FIG. 1) is applied to the rigid sled model using a complete 6 DOF description, i.e. accelerations in all three local directions, as well as rotational velocities around the same axes. The SAFER HBM model 26 (FIG. 2) is used to estimate driver kinematics during the PCVK 30 and the crash 32.

Figure 4:
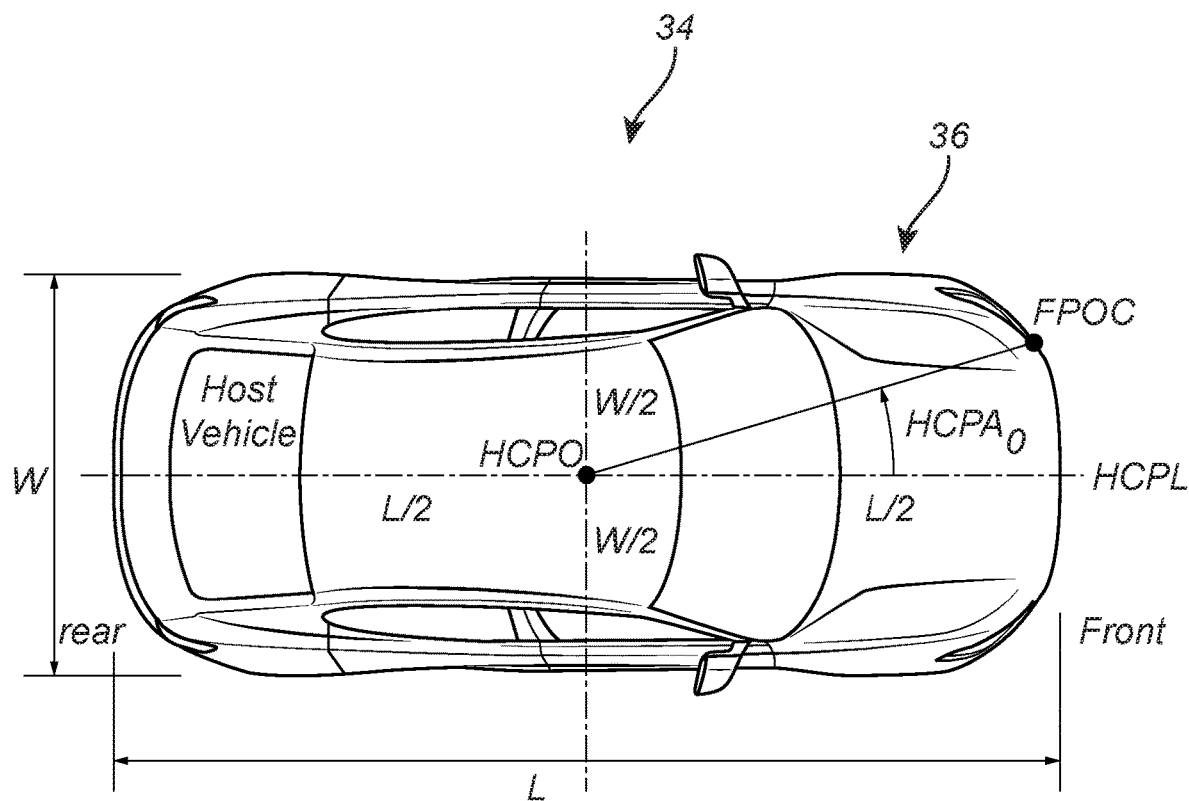
FIG. 4 is a definition of parametric crash configuration (PARCC) angles in a host vehicle.

Parametric Crash Configuration—PARCC (element 3) 16 (FIG. 1). In order to describe and store the states at crash initiation regarding positions, orientations, and velocities, the PARCC 16 is proposed. In this approach 34, illustrated in FIGS. 4-6, the first point of contact (FPOC) between two colliding objects is used (for visualization, two identical passenger vehicles are used here). This part of the crash configuration is to be interpreted as a birds-eye view (BEV) of the physical appearance of the two objects when first contact occurs. In this definition, the host vehicle 36 serves as the reference system according to the Society of Automotive Engineers (SAE), where the FPOC is described. Furthermore, the heading direction is defined to coincide with the longitudinal axis of each vehicle, even though in the generalized case the velocity vector at the time of collision may differ from the heading direction in the crash configuration. By utilizing the host center point (HCPO), a counter-clockwise angle around HCPO between the host center plane (HCPL) and the FPOC can be defined as the original host collision point angle (called HCPAO), as illustrated in FIG. 4.

Figure 5:
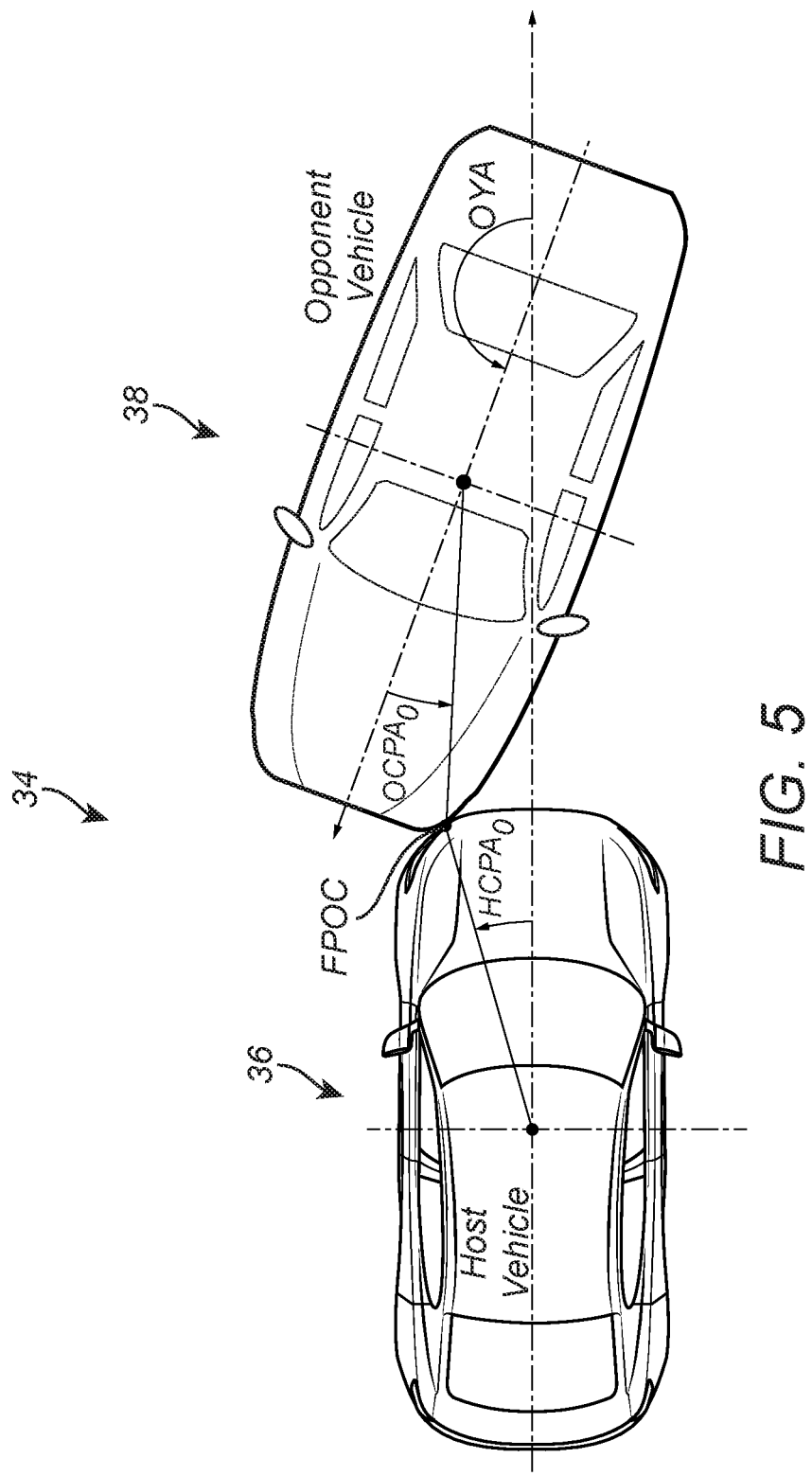
FIG. 5 is a definition of PARCC angles in host and opponent vehicles.
Figure 6:
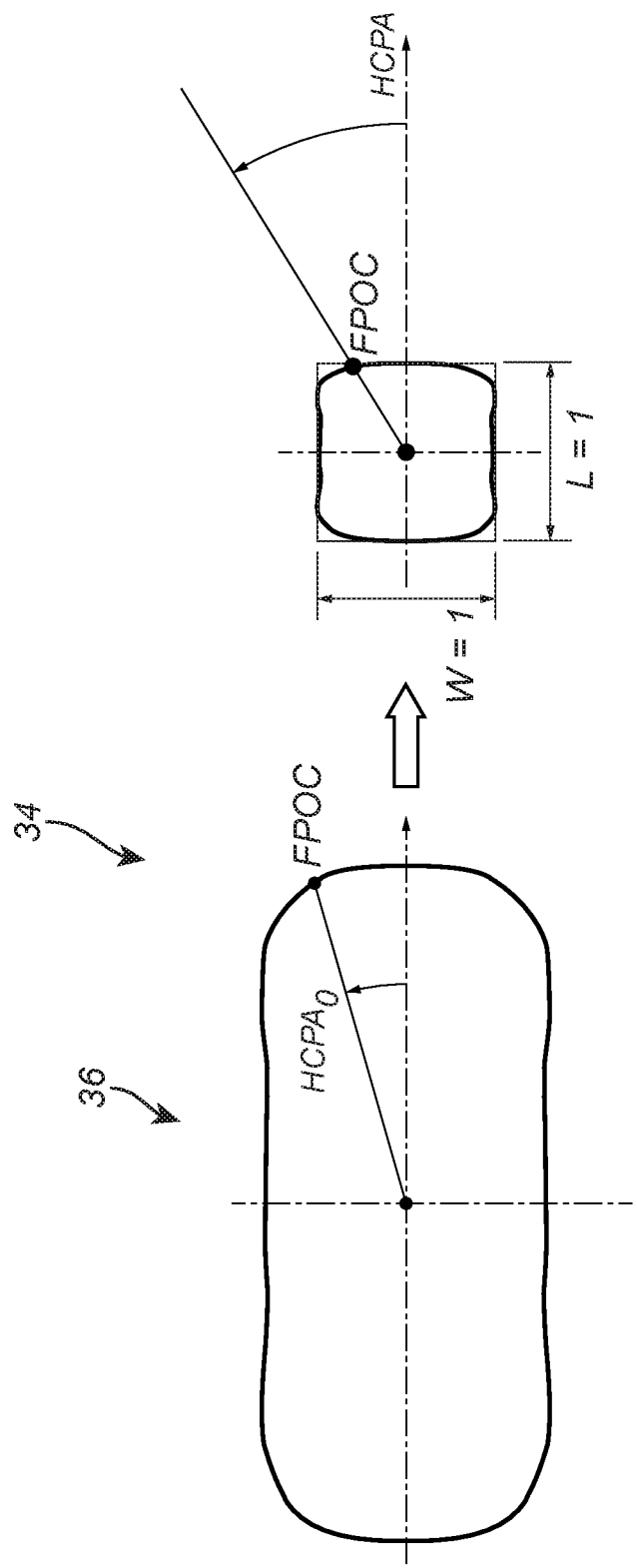
FIG. 6 is a description of a transformation from actual appearance to a square unit car system.

In the same way, the location of the FPOC on the opponent vehicle 38 is defined as the original opponent collision point angle (called OCPAO) using the local reference system of the opponent vehicle 38. By using a third angle in the horizontal plane, the heading direction of the opponent vehicle 38 is defined relative to the heading direction of the host vehicle 36. This angle is called the opponent yaw angle (OYA), as indicated in FIG. 5.

By using the definitions above, the description of the FPOC in terms of HCPAO and OCPAO is dependent on the vehicle width-to-length ratio. However, a more universal way of describing the angles is sought, therefore the vehicle dimensions including the FPOC are scaled to a square unit vehicle as described in FIG. 6. In this way, a transformed host collision point angle (HCPA) is defined for further use. The same procedure is applied to obtain the transformed opponent collision point angle (OCPA).

Figure 7:
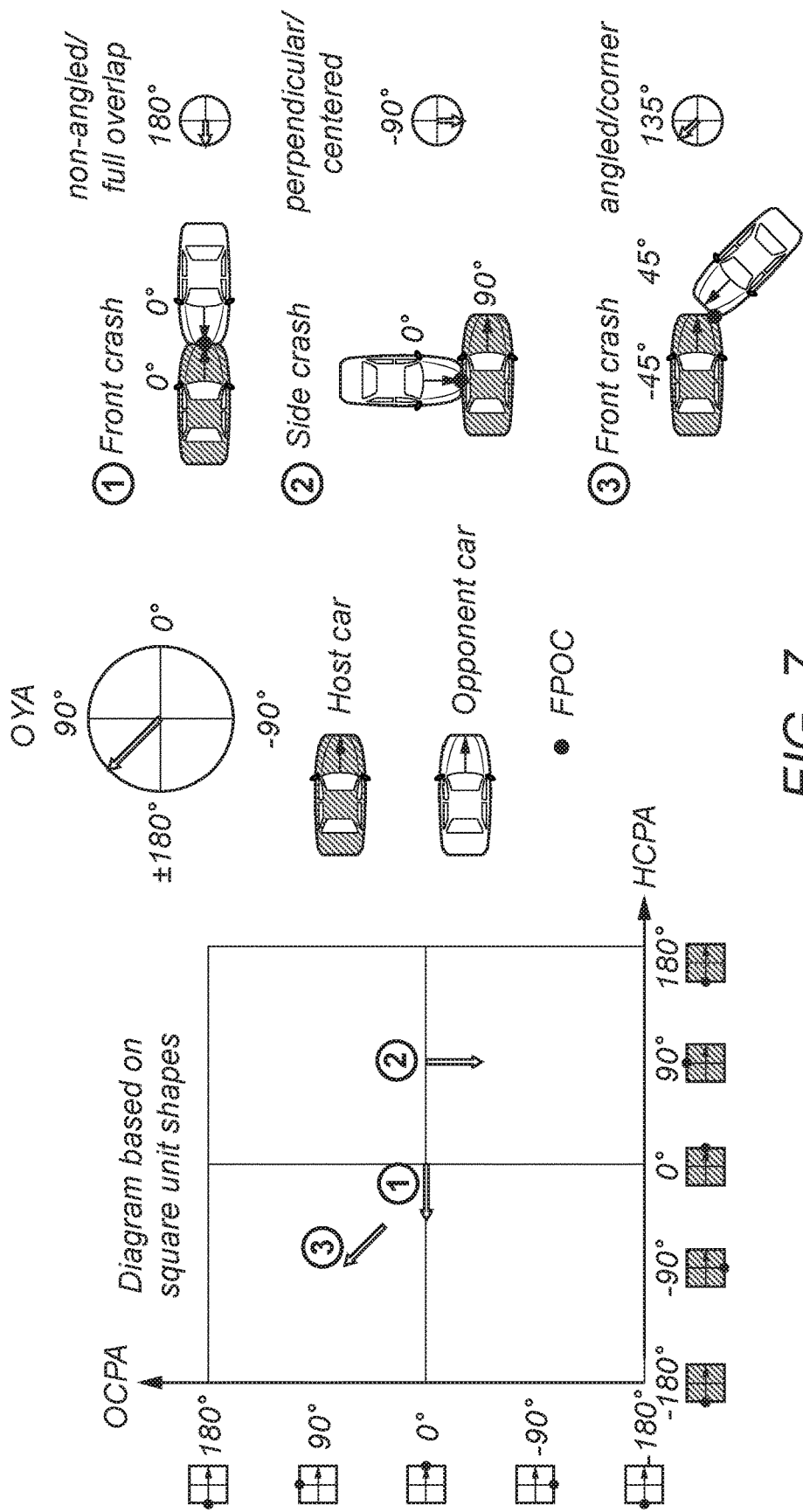
FIG. 7 is an example of how crash configurations are mapped into a diagram of opponent collision point angle (OCPA) vs. host collision point angle (HCPA) including opponent yaw angle (OYA)

The proposed method for describing crash configuration can be used as a tool for visualizing larger sets of crash configuration data to be considered in the development of safety systems. In FIG. 7, three examples of vehicle-to-vehicle collisions are used to explain how a crash configuration diagram can be created. FIG. 7 shows how the transformed host and opponent collision point angles HCPA and OCPA combined with the opponent yaw angle OYA for the impact direction gives a graphic illustration of each crash configuration directly in the diagram. By using a variety of vehicle types, it is seen that their shape generally has a small influence on the crash configuration. However, some crash configurations defined using a rectangular vehicle shape may differ from configurations where a vehicle with rounded corners is used.

Simplified Occupant Kinematics Model—SOCKIMO (element 4) 18. As previously stated, pre-crash simulations often consider a large amount of cases, typically more than a thousand for a specific conflict situation. To assess occupant pre-crash kinematics in these large datasets, the need for a computationally efficient model is identified as a tool that at an overall level describes how the pre-crash phase may affect occupant kinematics. It is therefore suggested to describe the upper body of a vehicle occupant as an inverted pendulum constrained in the sagittal plane. This model used for pure braking scenarios where the effect of AEB interventions could be quantified in terms of occupant pre-crash excursion. In the course of this work, a need for a model useful also in maneuvers including lateral accelerations is identified. This leads to the initiation of a project aimed at describing the occupant as one or more inverted pendula free to move in three dimensions. The studies conclude that a double pendulum model could be employed and using joint stiffness and damping parameters be tuned to fit the response of volunteers.

Figure 8:
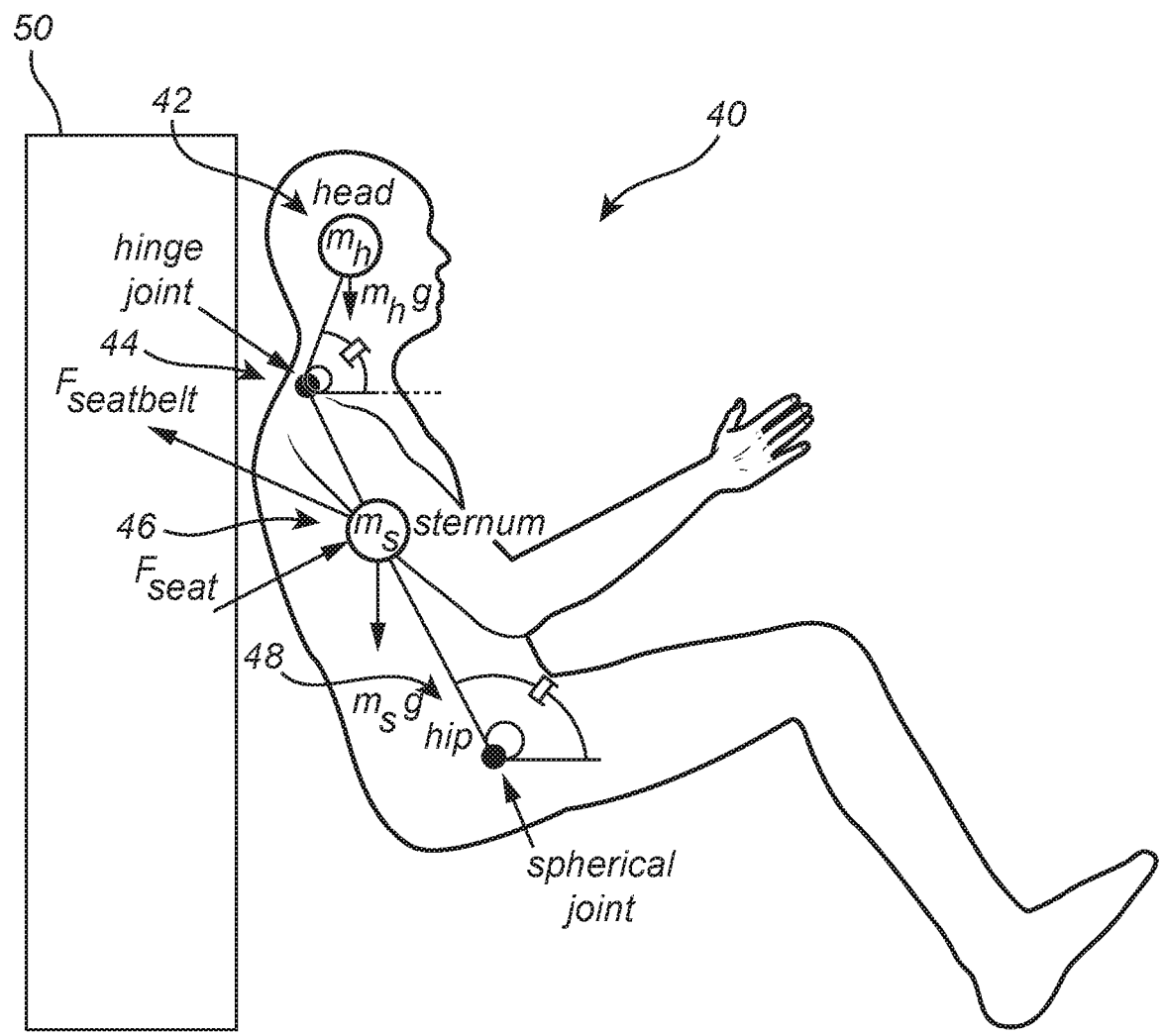
FIG. 8 is a side view of a driver HBM and a corresponding simplified mathematical model.

FIG. 8 provides a graphical representation of how the simplified model 40 is implemented. Rigid bodies are assumed between the head center of gravity 42, first thoracic vertebrae (T1) 44, sternum 46, and the hip joint 48. These are positions that were all featured as tracking points in available volunteer data, later used for tuning and validating the model 40. A lower inverted pendulum is based in the occupant hip joint location 48 and includes a point representing the sternum 46. At the upper end of the lower pendulum, corresponding to the center of the T1 vertebra 44, a hinge joint is defined. This hinge joint attaches to the upper pendulum that ends in the head center of gravity 42. By defining this hinge joint, the upper pendulum is constrained to movement in the plane initially defined by the hip joint 48, T1 44, and head center of gravity 42. Since this plane is updated corresponding to the displacement of the lower pendulum, the head center of gravity 42 is free to move out of the initial sagittal plane.

The seat back 50 was modeled as a contact to prevent the pendula model from tilting rearwards, using contact stiffness based on an FE model representing a typical passenger vehicle seat. Seat belt forces were assumed to be applied in the point representing the sternum 46 on a fixed distance between the hip joint 48 and T1 44, as illustrated in FIG. 8. In both the lower (spherical) joint 48 and the upper (hinge) joint 44, two parameters were introduced characterizing the stiffness (Nm/rad) and the damping (Nm/rad/s).

Figure 9:
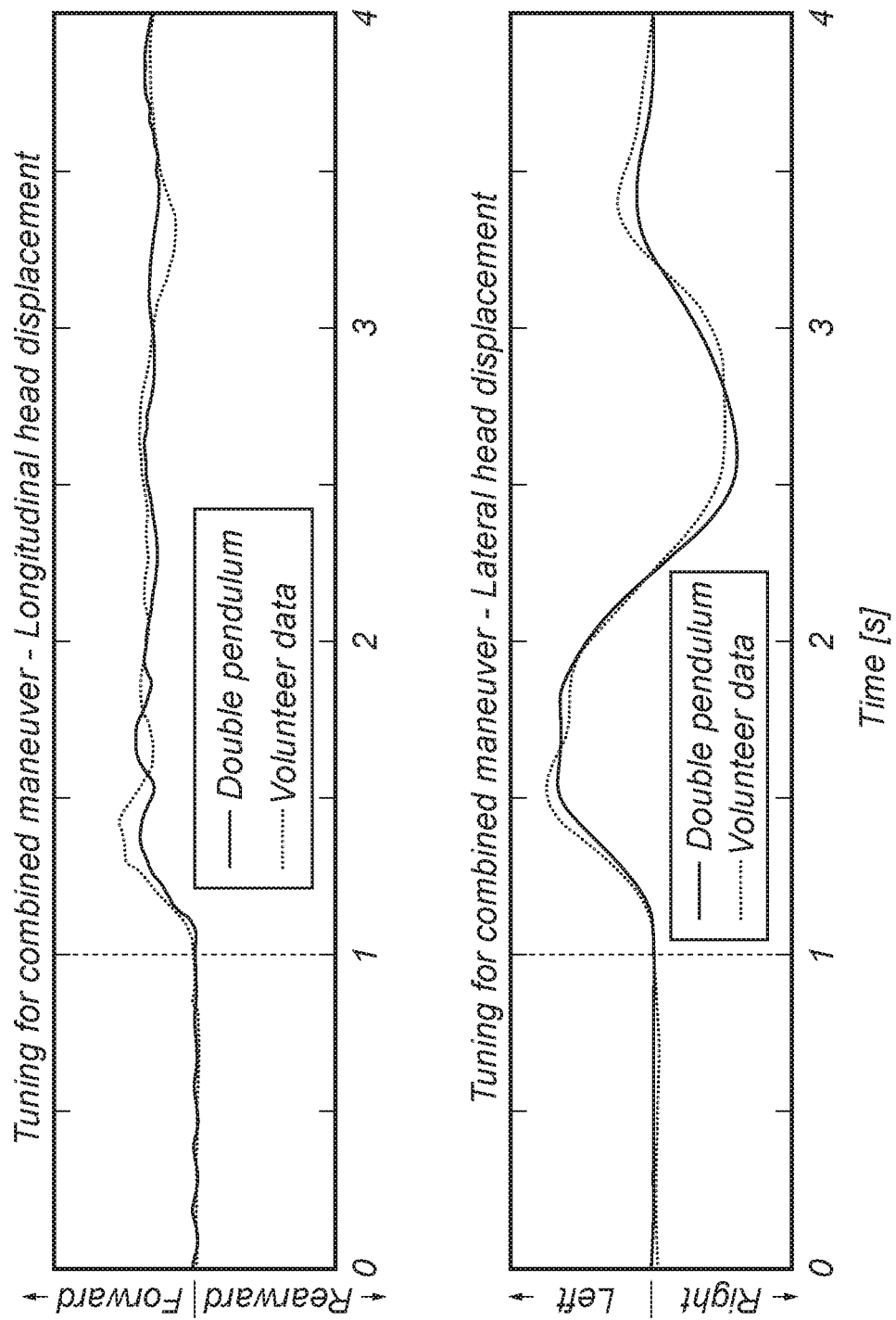
FIG. 9 is an example of a tuned double pendulum model output compared to volunteer data.

In order to find appropriate joint parameters, volunteer tests are used and the model is tuned accordingly. This process enables parameter sets representing a range of individual volunteer responses, and the final SOCKIMO 18 (FIG. 1) includes seven different such sets, for example. The tuning process shows that the SOCKIMO 18 can capture not only the magnitude of excursion but also the dynamic response, as shown in FIG. 9. The combined maneuver for which the model is tuned consists of steering and braking with maximum accelerations of approximately 0.5 g.

Figure 10:
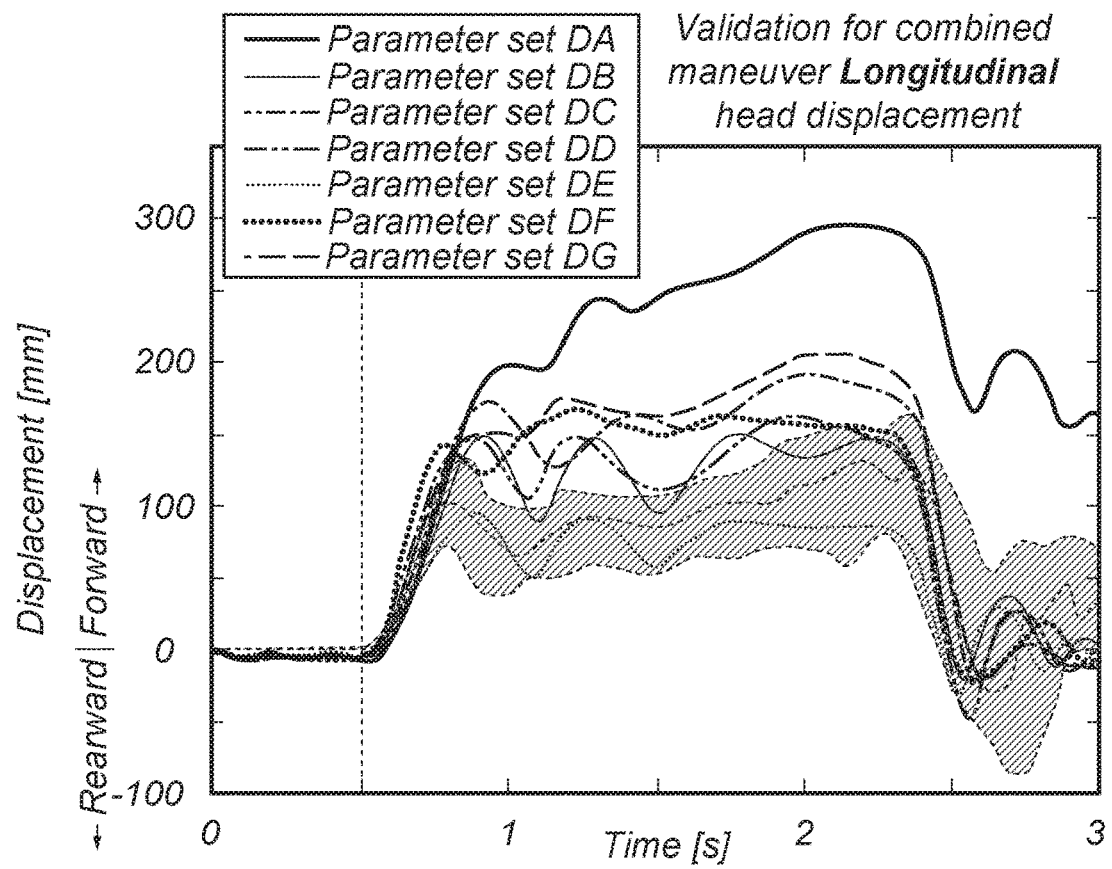
FIG. 10 is a validation in combined braking and steering maneuvers.
Figure 10:
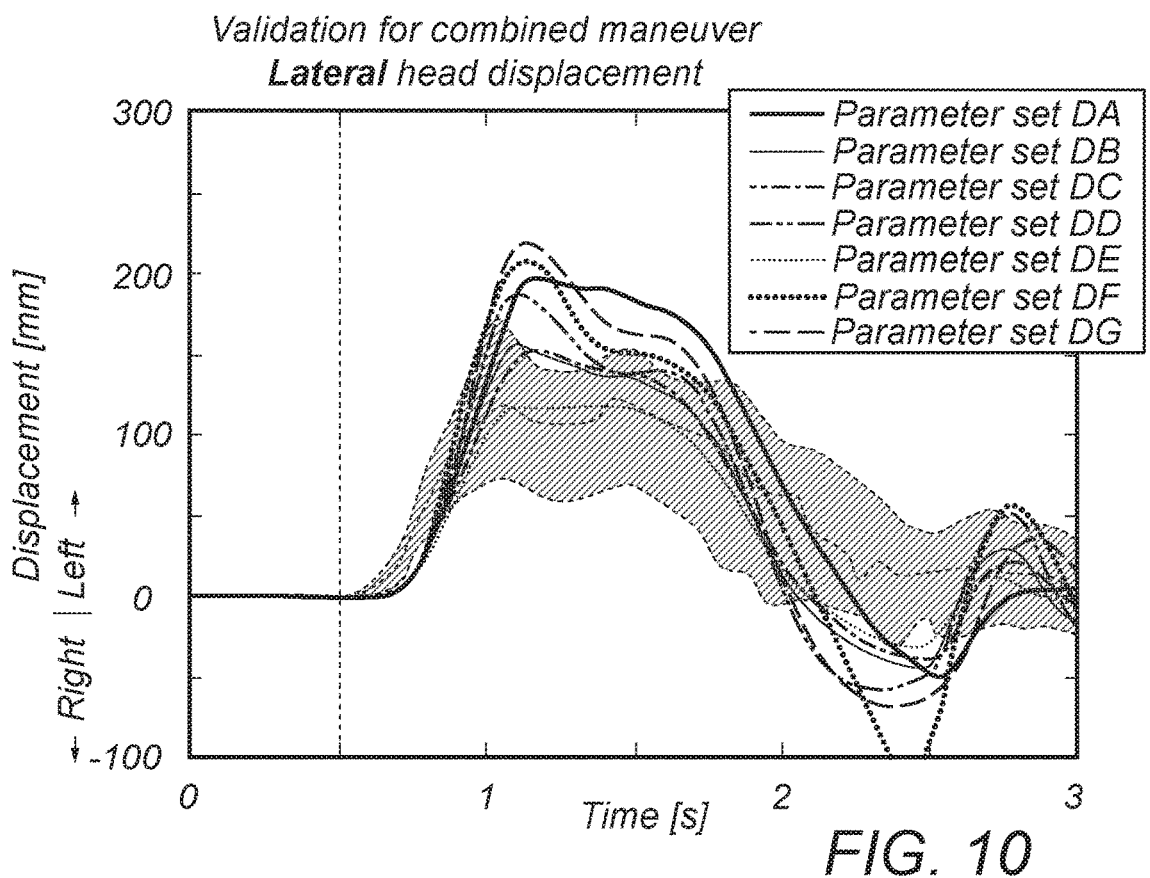

The tuned SOCKIMO 18 is thereafter validated by using a separate data set, as shown in FIG. 10. From these volunteer tests, a corridor representing the and $0.16^{th}$ and $0.84^{th}$ quantiles of the response of 25 volunteers is used and compared to the model response.

EXAMPLE CASE. To demonstrate the methodology, an example case was selected from left turn/oncoming direction (LT/OD) conflict situations. These are characterized by the host vehicle turning left in a crossing and being struck by an oncoming vehicle that approaches from the direction opposite to the host vehicle initial direction, i.e. before the turn is initiated.

Case selection (elements 1-6). In the first stage, the baseline generation framework was applied. First, crashes in a TAD were classified and LT/OD crashes were identified. Crash case analysis was performed on the pre-crash phase of each case in detail, and a dataset was generated from all cases. In this dataset, each crash was described numerically in a THd format where each time step, during 15 seconds before the crash or near-crash, depicts the vehicle trajectories, the road environment, the participants, and their characteristics. In order to compensate for uncertainties in the data relating to case data quality and contingency of distributions, variations of parameters were implemented as synthetic cases in a THd-batch, including in total 940 cases for simulation.

Pre-crash Baseline and Treatment simulations were performed as a next step. In the baseline setting, all cases resulted in a collision for which the host vehicle impact speed ranged from 4 to 30 km/h, and the opponent vehicle speed ranged from 4 to 131 km/h. By using a conceptual AEB system, a portion of the cases were completely avoided and, in another portion, there was no effect of the AEB system. In a third portion, mitigation of the crash was achieved by the AEB system. All remaining crashes were analyzed in further detail utilizing the crash configuration depicting method PARCC and the SOCKIMO, and typical situations were identified for the case study.

Figure 11:
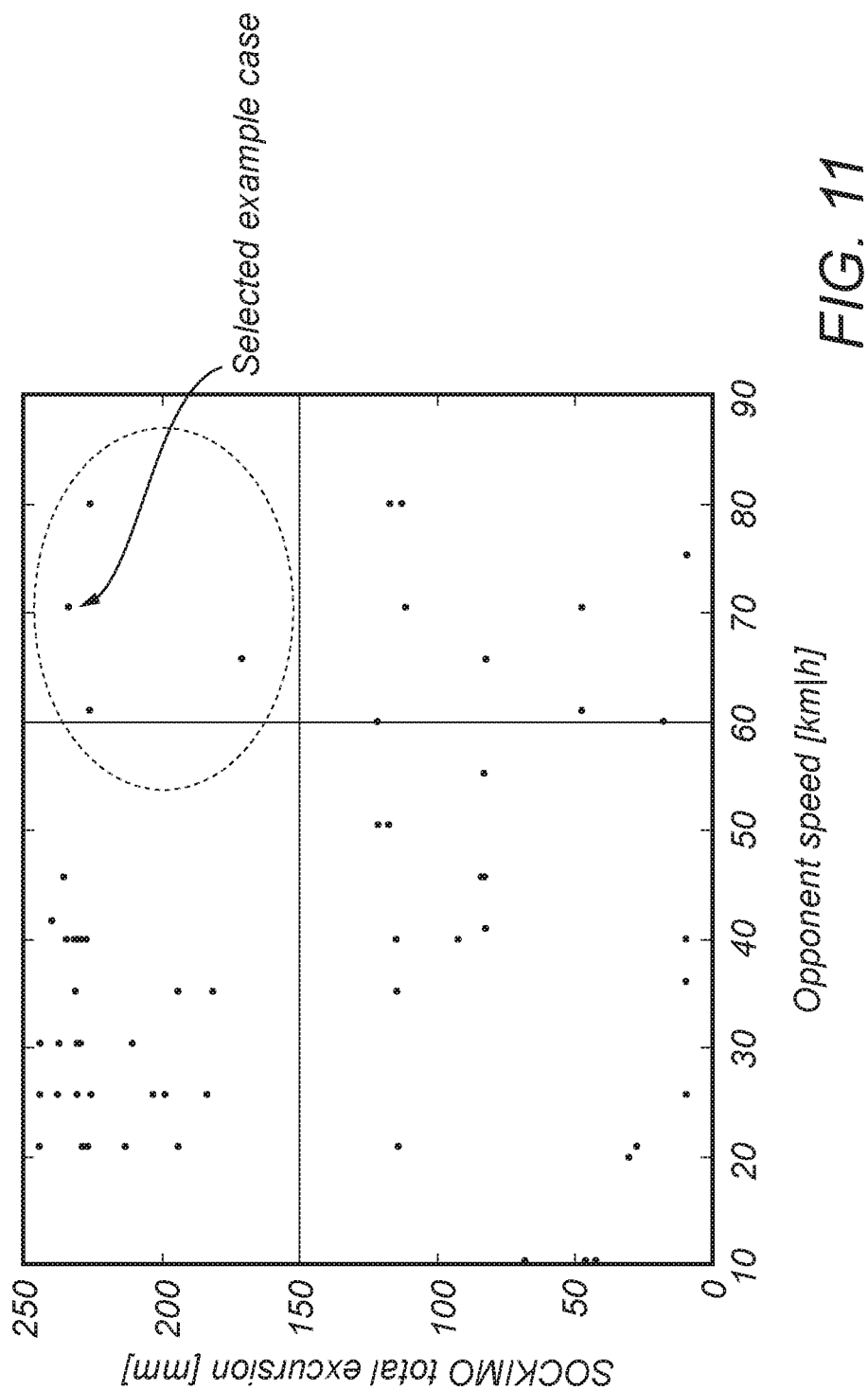
FIG. 11 is a simplified occupant kinetics model (SOCKIMO) max head excursion (mean of 7 occupant parameter settings, mm) vs. opponent speed (km/h)

The SOCKIMO was used to identify cases with large occupant pre-crash excursions in combination with a substantial crash severity. The SOCKIMO analysis was made with an average of the seven occupant parameter sets in FIG. 10. Initially, a maximum SOCKIMO total head excursion above 150 mm during the complete pre-crash maneuver was used as filtering criterion. An additional filtering criterion was used to find one example case for which a substantial crash severity was present. Since the crash severity in the studied cases is highly governed by the impact speed of the opponent vehicle, cases with an opponent speed above 60 km/h were selected, see four encircled candidate cases in FIG. 11. A case with a crash configuration notably modified by the AEB intervention was selected, resulting in the example case described in Table 1. Both Baseline and Treatment cases included a maximum vehicle lateral acceleration of 1.5 m/s² and maximum yaw velocity of 21 deg/s.

TABLE 1

Example case crash configurations and AEB description for Baseline and Treatment, respectively.

| | Crash configuration | | | | Pre-crash |
|---|---|---|---|---|---|
| | Host speed | Opponent speed | OYA | HCPA | OCPA | intervention |
| Baseline | 15 km/h | 70 km/h | 150° | −45° | 11° | None |
| Treatment | ~0 km/h | 70 km/h | 151° | −6° | 45° | AEB: Max longitudinal acceleration 12 m/s² |

The selected case was then simulated using the SAFER HBM occupant model positioned in the host vehicle in four different combinations of PCVK and crash pulse, as described in Table 2. Simulations BB and TT describe the cases from the CA-CAE tool shown in Table 1, and simulations denoted nB and TB were included in order to study the individual effects of PCVK and crash pulse, respectively. The FE structural crash simulations were performed using two identical mid-size passenger vehicles to provide the crash pulse needed for the FE A-HBM occupant simulation.

TABLE 2

Overview of simulations.

| Simulation code | PCVK | Crash pulse |
| --- | --- | --- |
| nB | (none) | Baseline |
| BB | Baseline | Baseline |
| TT | Treatment | Treatment |
| TB | Treatment | Baseline |

Output from FE A-HBM occupant simulation—element 7. A clear effect from the pre-crash maneuver as well as crash configuration on driver head trajectory in a vehicle-fixed coordinate system could be seen, see FIG. 12. The measured effect of the Baseline PCVK is a maximum excursion of 28 mm forward (x) and 44 mm to the right (y). The Treatment PCVK results in a maximum excursion 148 mm forward (x) and 46 mm to the right (y). However, the Treatment PCVK final position is 30 mm rearward (x) and 36 mm to the left (Y) of the origin.

Figure 12:
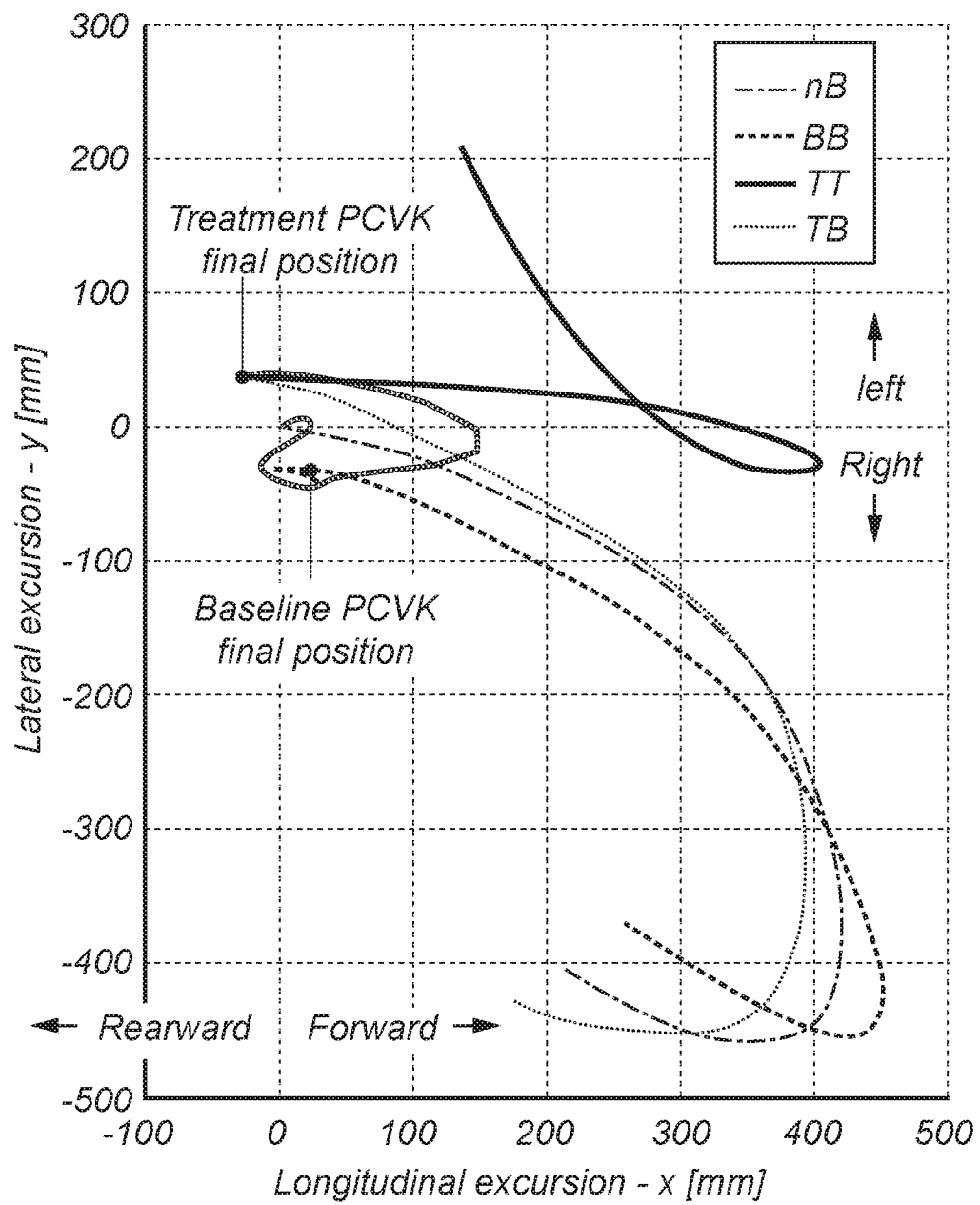
FIG. 12 is a complete sequence trajectories of a SAFER HBM driver head center of gravity, vehicle-fixed coordinate system.
Figure 13:
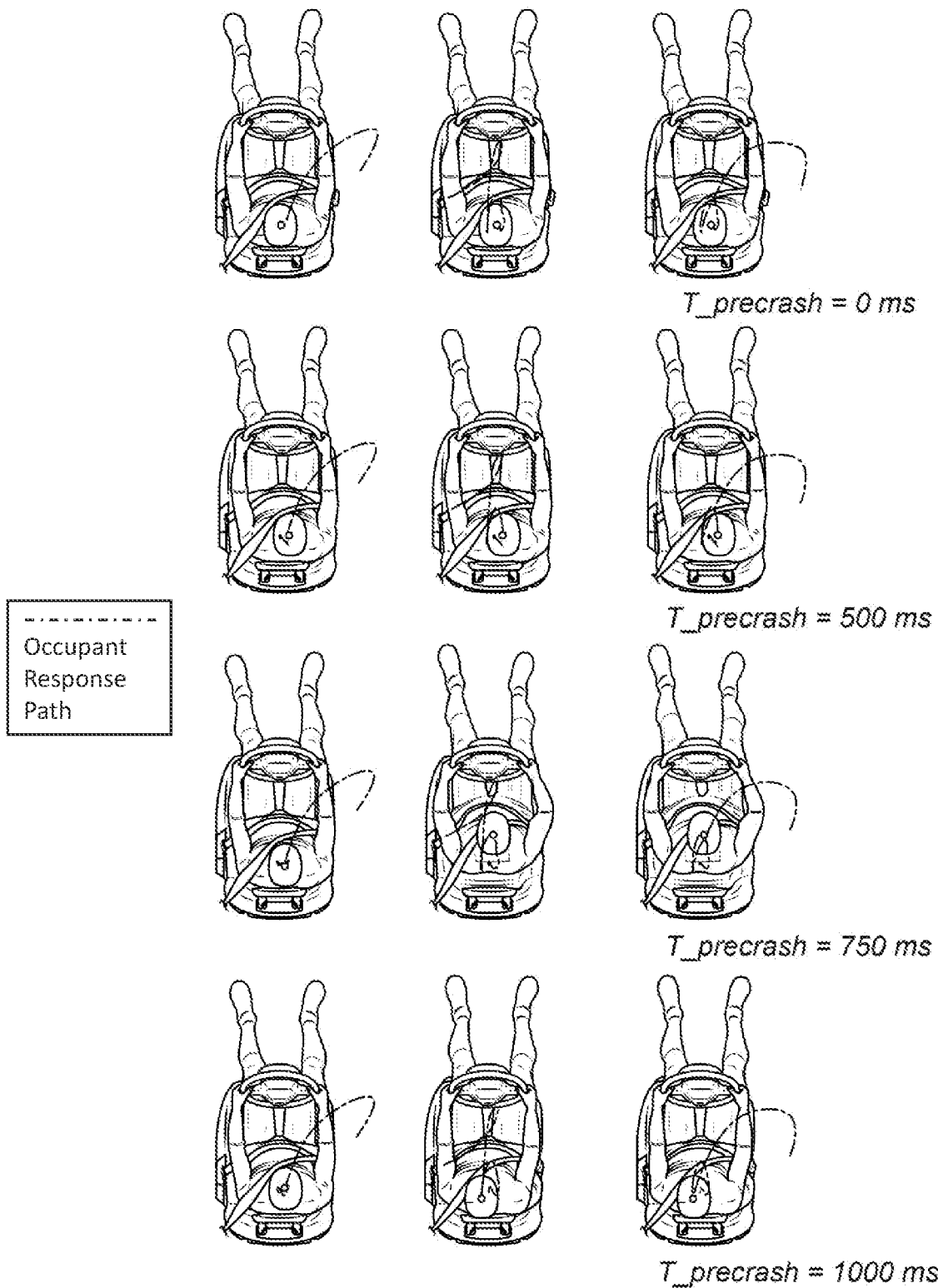
FIG. 13 is an occupant response in an example case during a pre-crash maneuver.
Figure 14:
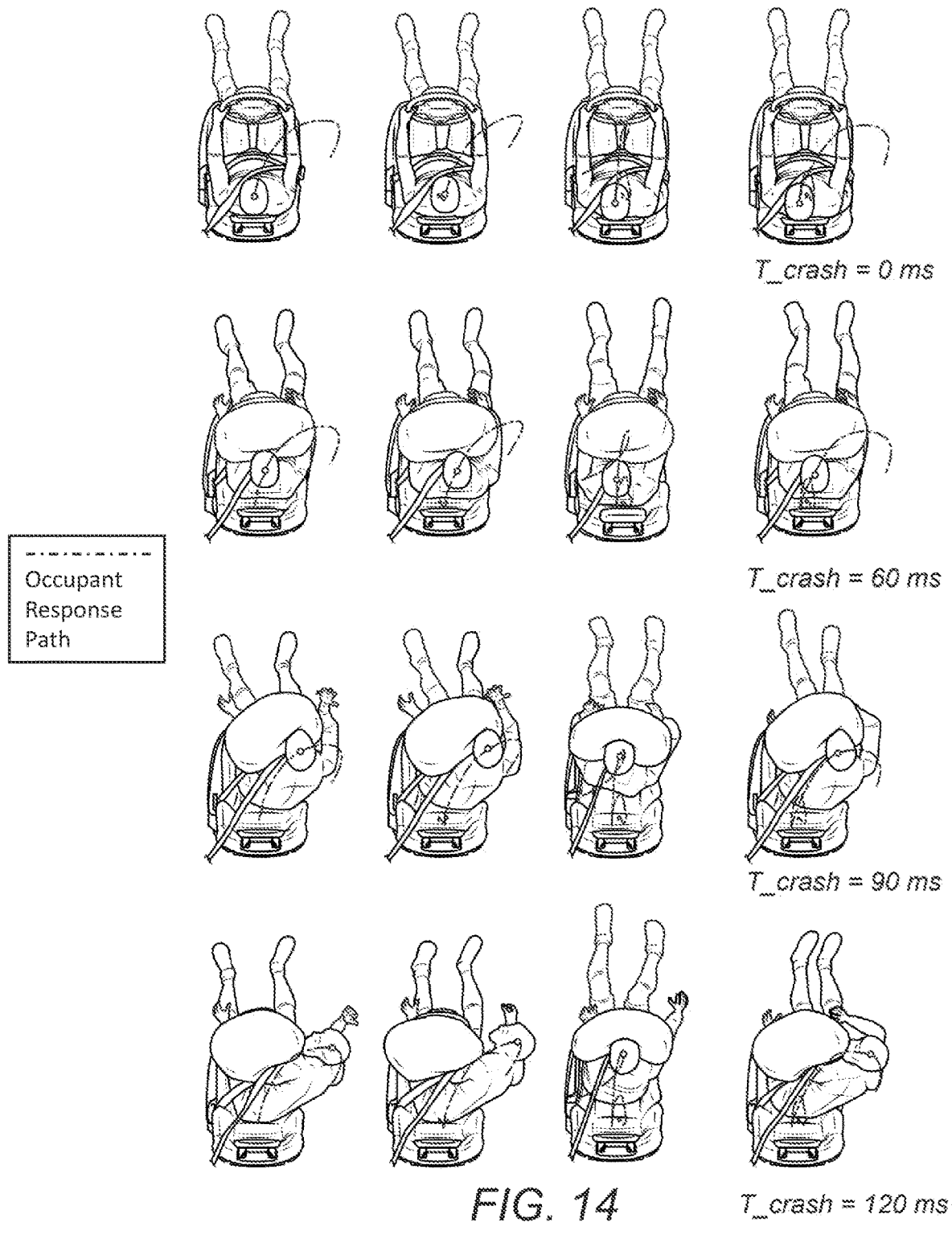
FIG. 14 is an occupant response in an example case during an oblique crash.

By further analyzing the head center of gravity trajectories in FIG. 12 during the crash phase, it was found that the effect of introducing the Treatment crash had a considerable effect. The Baseline crash pulse introduced a substantial lateral component to the crash pulse, which leads to occupant excursion that has approximately the same magnitude to the right as forward. In the Treatment crash (see Table 1), the opponent vehicle overlaps the host vehicle to a lesser extent, thereby reducing the lateral acceleration component of the host vehicle during the crash phase. The Treatment crash pulse leads to an occupant excursion with low deviation from the vehicle longitudinal direction and increases the lateral excursion only during rebound.

When comparing the three simulations where the Baseline crash pulse was used (nB, BB, and TB), it was found that although the initial positions for the crash phase differed, the head trajectory during crash was similar. The maximum lateral head displacement in simulations nB, BB, and TB was approximately the same at 450-460 mm. The TB simulation results however suggested that an outboard/rearward initial crash position (i.e. to the left of and behind the origin) led to a longer duration of the interaction with the driver airbag reducing the maximum forward displacement compared to nominal position in the nB simulation. In contrast, the BB simulation results suggested a shorter airbag interaction duration, which was associated with a larger maximum forward displacement.

Thus, the present disclosure provides a CAE methodology that allows for estimation of the combined safety effects from collision avoidance and injury prevention systems. In a demonstration case, combinations of pre-crash maneuvers and subsequent crash was presented as an example of the feasibility of the method. The present methodology constitutes a framework for dealing with the large data sets that can be generated through CAE pre-crash simulations of collision avoidance technologies applied to real-world traffic situations. A crash configuration definition for setting up crash simulations or physical crash tests was introduced and a simplified occupant kinematic model for filtering out cases for detailed analysis is provided. The SOCKIMO provided an indication of large occupant pre-crash excursion that was also reflected when using the SAFER HBM.

Cases were filtered out when the largest SOCKIMO excursion exceeded 150 mm, regardless when this maximum excursion occurred during the pre-crash maneuver. The excursion at the time of crash initiation may prove to be a better metric for occupant pre-positioning relevant for injury prediction. On the other hand, once a large occupant excursion has occurred, this could be associated with non-linear effects that the SOCKIMO is not able to capture. Such an example could be seat belt interaction where the effect on occupant kinematics could be studied in a more realistic way using the A-HBM, for which also the effect of electrical reversible retractors (ERR) can be studied. There is a risk that the SOCKIMO will point out cases where the occupant excursion is not a problem in terms of predicted injury risk during the crash phase. This depends on the combination of pre-crash maneuver and type of crash. For some crashes, certain pre-crash maneuvers may actually be beneficial for improving the occupant interaction with the restraint system, in some cases unfavorable. Another factor that influences the occupant pre-crash excursion is whether the arms are used for bracing against the steering wheel or other vehicle interior components. In the current implementation, the SOCKIMO is optionally tuned for front seat passengers for which no bracing is present, while the SAFER HBM was run as a driver with hands on the steering wheel and active arm muscles simulating this bracing. This could be one reason why the SOCKIMO head excursion exceeds that of the driver A-HBM. (SOCKIMO ca 230 mm in FIG. 11 vs A-HBM approximately 150 mm, FIG. 12). An additional reason for this may be found when observing validation data suggesting that several of the seven parameter sets of the SOCKIMO lead to pre-crash motions larger than the volunteer corridors as shown in FIG. 10. Occupant excursion as predicted by the SOCKIMO may not be accurate as a prediction of actual occupant excursion but rather as an indicator when comparing sets of pre-crash vehicle kinematic data.

The crash simulation phase in this study was performed using a rigid sled, i.e. assuming no compartment intrusion. Although modern passenger vehicles often exhibit minimal intrusion, there are and will still be situations where this is not the case. Typically, this assumption could not be made when intrusion occurs in the direct surrounding of the occupant such as in side impacts. In such cases, a deformable sled where intrusions are recorded from full-scale structural FE crash simulations and then applied to the virtual sled with the A-HBM may be useful. Alternatively, the A-HBM can be placed directly in the full-scale model, however this approach is currently judged as unfeasible due to the large simulation effort that would further limit the number of studied cases.

The proposed crash configuration method PARCC was shown to be sensitive to changes based on pre-crash AEB interventions. Although the provided example case displayed large differences in terms of PARCC parameters and subsequently significantly different resulting crash pulses, the methodology is detailed enough to describe also subtle geometrical changes in crash configuration not captured in established methods using e.g. CDC. PARCC was demonstrated in vehicle-to-vehicle crash situations, however it can also be applied to collision objects such as trucks or vulnerable road users. In order for the method to remain generic, the shape of the traffic objects should be defined in such a way that only one point is intersected at a time when a vector is swept the full 360 degrees around the object center as described in the crash configuration section.

Thus, a methodology for predicting the performance of safety systems with a combined effect from collision avoidance and injury prevention features is presented. In this process, methods for describing crash configurations are introduced. This method supports detailed descriptions of crashes and is sensitive to changes in configurations based on pre-crash maneuvers. Further, a SOCKIMO is introduced as a tool for filtering out cases where considerable occupant pre-crash excursion can be suspected to occur. The feasibility of the individual elements of this methodology to function together is demonstrated in an example case where autonomous emergency braking leads to a considerable change in the crash configuration and is predicted to introduce substantial occupant pre-crash excursion. In addition, in this example case it is shown that the present A-HBM tool is able to cover the complete sequence of events from pre-crash maneuvers to crash in one single simulation, thereby demonstrating how the tool chain efficiently contributes to evaluating the injury prevention effects from both pre-crash and crash countermeasures in the vehicle.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 15:
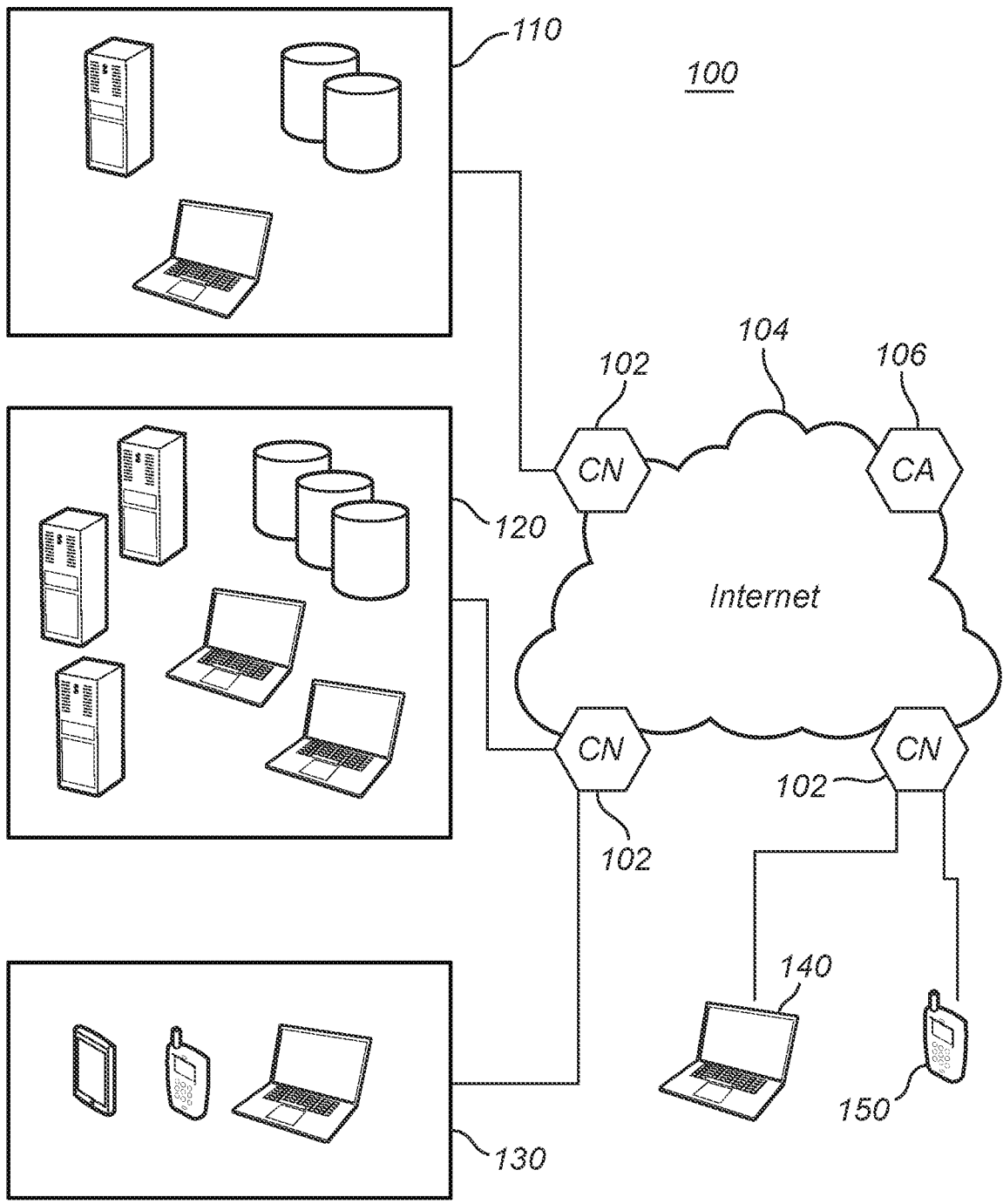
FIG. 15 is a network diagram of a cloud-based system for implementing various cloud-based methodologies of the present disclosure.
Figure 16:
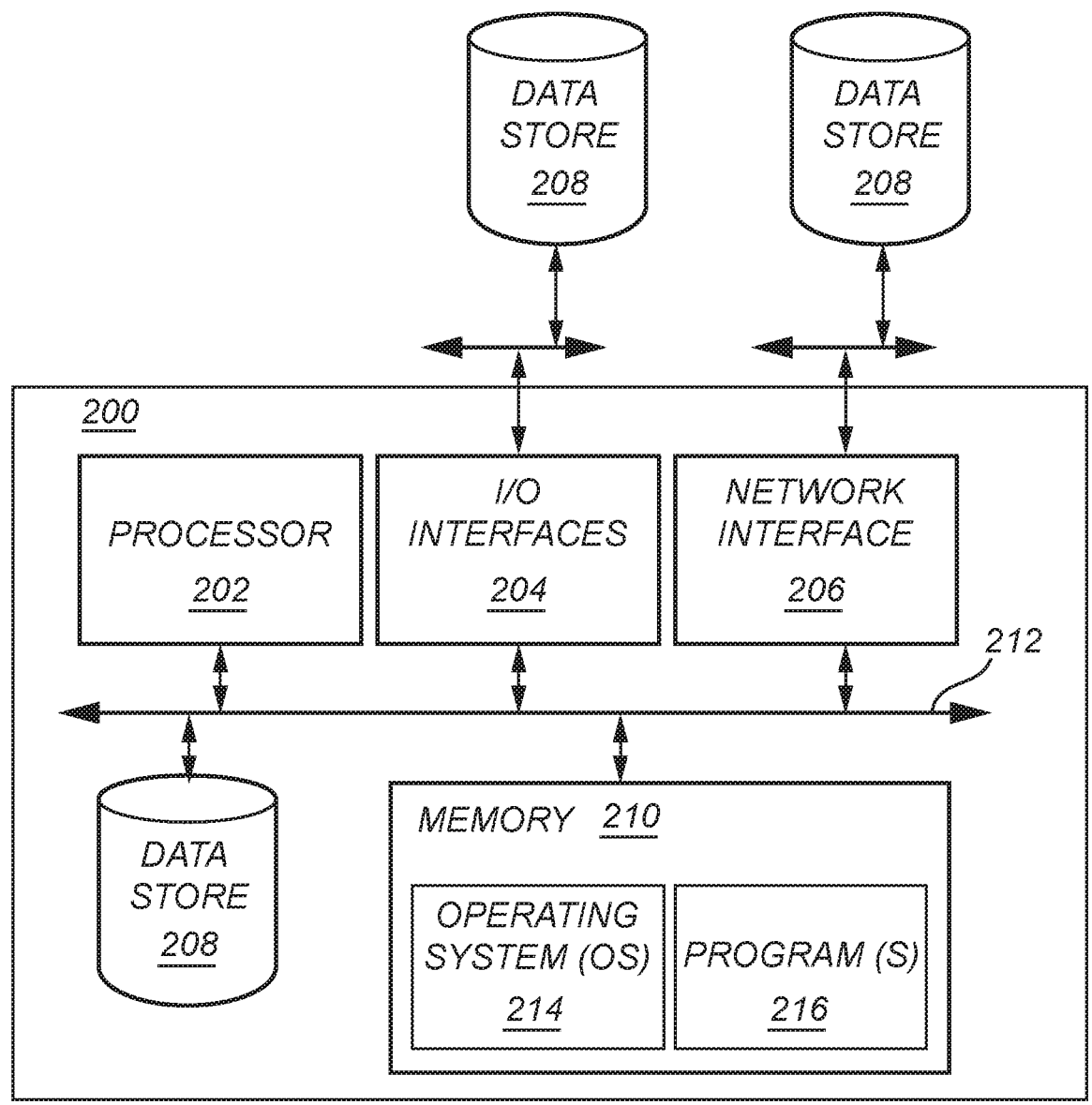

FIG. 15 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 16) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 16 is a block diagram of a server 200, which may be used in the cloud-based system 100 (FIG. 15), in other systems, or standalone. For example, the CNs 102 (FIG. 15) and the central authority nodes 106 (FIG. 15) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 16 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 15). The network interface 206 may include, for example, an Ethernet card or adapter (e.g., 10 BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), non-volatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), non-volatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer readable storage medium having computer readable code stored thereon for programming a computer, server, appliance, device, processor, circuit, etc. each of which may include a processor to perform functions as described and claimed herein. Examples of such computer readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 17:
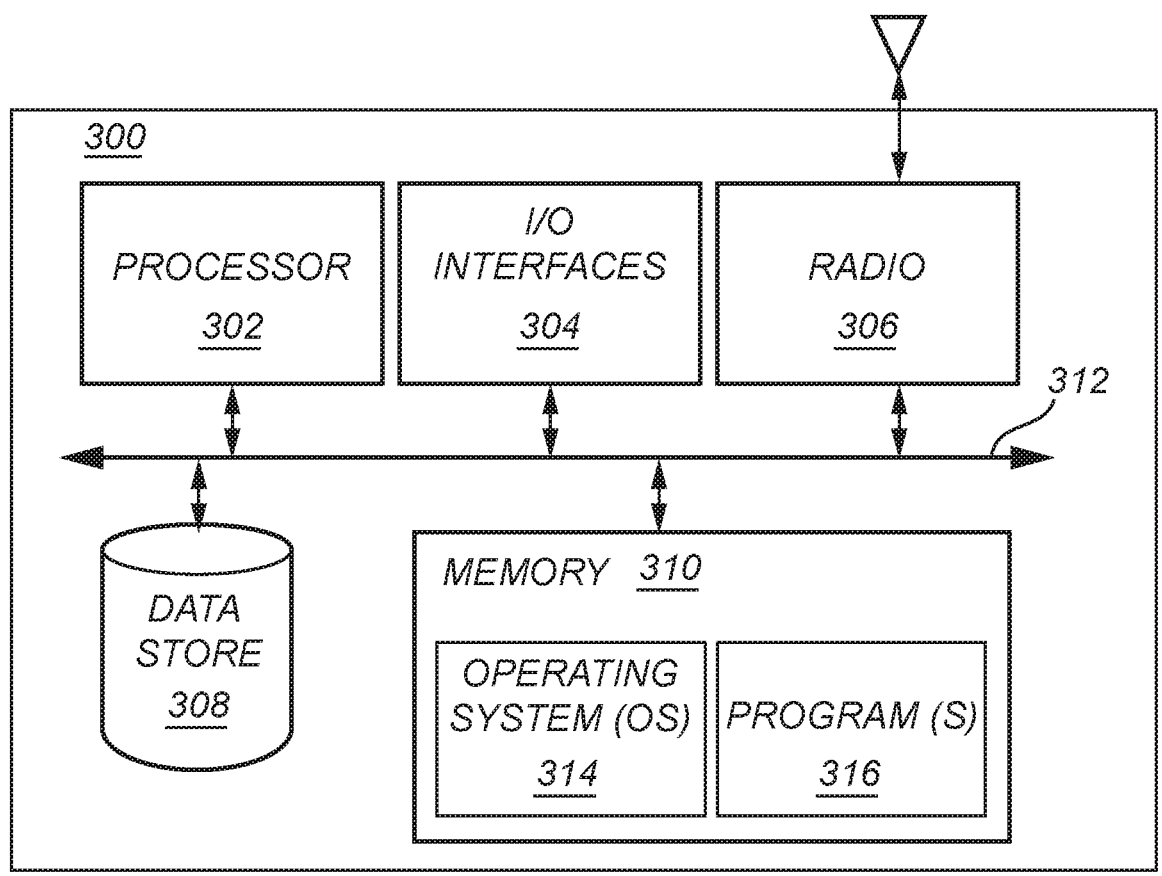

FIG. 17 is a block diagram of a user device 300, which may be used in the cloud-based system 100 (FIG. 15) or the like. Again, the user device 300 can be a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 17 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 17, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100 (FIG. 15).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method implemented on a computer, the method comprising:
 receiving, at one or more processors, first input related to expected states of a vehicle and another vehicle or object at impact event initiation for a plurality of cases with positions, orientations, and velocities as parameters used for impact event evaluation;
 receiving, at the one or more processors, second input related to expected vehicle pre-crash occupant position and position excursion during a pre-impact event maneuver for at least a portion of the plurality of cases; and
 simulating, utilizing the one or more processors, an impact event for a simulation case of the plurality of cases using both the first input and the second input to improve the performance of a safety system of the vehicle with a combined effect from a collision avoidance feature and an injury prevention feature.

2. The method of claim 1, further comprising filtering out a case of the plurality of cases where the vehicle occupant pre-crash position excursion during the pre-impact event is expected to exceed a predetermined threshold,
 wherein the filtered-out case of the plurality of cases comprises the simulation case.

3. The method of claim 1, wherein the first input comprises real-world pre-impact event data related to paths, velocities, and surroundings in time history data format.

4. The method of claim 1, wherein the first input comprises output from a computer aided engineering simulation of a Baseline impact event without a collision avoidance system implemented and a Treatment impact event with the collision avoidance system implemented.

5. The method of claim 1, wherein the first input comprises parametric crash configuration data related to the vehicle and the another vehicle or object at the impact event initiation.

6. The method of claim 1, wherein the second input comprises a simplified occupant kinetics model.

7. The method of claim 1, wherein simulating the impact event for the simulation case comprises simulating effects of a pre-crash phase and the impact event using vehicle occupant and interior models using an active human body model.

8. The method of claim 1, wherein simulating the impact event for the simulation case comprises simulating vehicle structural effects of the impact event using a structural simulation.

9. A non-transitory computer readable medium comprising combined safety system performance simulation and evaluation instructions stored in a memory and executed by a processor to carry out steps, the steps comprising:
 receiving first input related to expected states of a vehicle and another vehicle or object at impact event initiation for a plurality of cases with positions, orientations, and velocities as parameters used for impact event evaluation;
 receiving second input related to expected vehicle pre-crash occupant position and position excursion during a pre-impact event maneuver for at least a portion of the plurality of cases; and
 simulating an impact event for a simulation case of the plurality of cases using both the first input and the second input to improve the performance of a safety system of the vehicle with a combined effect from a collision avoidance feature and an injury prevention feature.

10. The non-transitory computer readable medium of claim 9, wherein the steps further comprise filtering out a case of the plurality of cases where the vehicle occupant pre-crash position excursion during the pre-impact event is expected to exceed a predetermined threshold,
 wherein the filtered-out case of the plurality of cases comprises the simulation case.

11. The non-transitory computer readable medium of claim 9, wherein the first input comprises real-world pre-impact event data related to paths, velocities, and surroundings in time history data format.

12. The non-transitory computer readable medium of claim 9, wherein the first input comprises output from a computer aided engineering simulation of a Baseline impact event without a collision avoidance system implemented and a Treatment impact event with the collision avoidance system implemented.

13. The non-transitory computer readable medium of claim 9, wherein the first input comprises parametric crash configuration data related to the vehicle and the another vehicle or object at the impact event initiation.

14. The non-transitory computer readable medium of claim 9, wherein the second input comprises a simplified occupant kinetics model.

15. The non-transitory computer readable medium of claim 9, wherein simulating the impact event for the simulation case comprises simulating effects of a pre-crash phase and the impact event using vehicle occupant and interior models using an active human body model.

16. The non-transitory computer readable medium of claim 9, wherein simulating the impact event for the simulation case comprises simulating vehicle structural effects of the impact event using a structural simulation.

17. A system, comprising:
memory storing vehicle simulation instructions executed by a processor for receiving first input related to expected states of a vehicle and another vehicle or object at impact event initiation for a plurality of cases with positions, orientations, and velocities as parameters used for impact event evaluation;
the memory storing vehicle occupant simulation instructions executed by the processor for receiving second input related to expected vehicle pre-crash occupant position and position excursion during a pre-impact event maneuver for at least a portion of the plurality of cases; and
the memory storing combined impact event simulation instructions executed by the processor for simulating an impact event for a simulation case of the plurality of cases using both the first input and the second input to improve the performance of a safety system of the vehicle with a combined effect from a collision avoidance feature and an injury prevention feature.

18. The system of claim 17, further comprising the memory storing focus case selection instructions executed by the processor for filtering out a case of the plurality of cases where the vehicle occupant pre-crash position excursion during the pre-impact event is expected to exceed a predetermined threshold,
wherein the filtered-out case of the plurality of cases comprises the simulation case.

19. The system of claim 17, wherein:
the first input comprises:
real-world pre-impact event data related to paths, velocities, and surroundings in time history data format,
output from a computer aided engineering simulation of a Baseline impact event without a collision avoidance system implemented and a Treatment impact event with the collision avoidance system implemented, and
parametric crash configuration data related to the vehicle and the another vehicle or object at the impact event initiation, and
the second input comprises:
a simplified occupant kinetics model,
wherein simulating the impact event for the simulation case comprises simulating effects of a pre-crash phase and the impact event using vehicle occupant and interior models using an active human body model and simulating the vehicle structural effects of the impact event using a structural simulation.

20. The method of claim 1, further comprising:
filtering out a case of the plurality of cases, utilizing the one or more processors, in which at least one of the received first input or the received second input indicates at least one of a high crash severity, a predetermined impact location, or that the vehicle occupant pre-crash position excursion during the pre-impact event maneuver is expected to exceed a predetermined threshold,
wherein the filtered-out case of the plurality of cases comprises the simulation case.

* * * * *